(12) United States Patent
Assa

(10) Patent No.: US 10,579,734 B2
(45) Date of Patent: Mar. 3, 2020

(54) WEB-BASED INFLUENCE SYSTEM AND METHOD

(71) Applicant: SAYIQAN LTD, Herut (IL)

(72) Inventor: Haim Assa, Tel Aviv (IL)

(73) Assignee: SAYIQAN LTD, Herut (IL)

( * ) Notice: Subject to any disclaimer, the term of this patent is extended or adjusted under 35 U.S.C. 154(b) by 714 days.

(21) Appl. No.: 15/223,722

(22) Filed: Jul. 29, 2016

(65) Prior Publication Data

US 2016/0364379 A1    Dec. 15, 2016

Related U.S. Application Data

(63) Continuation of application No. PCT/IL2015/050147, filed on Feb. 10, 2015.

(30) Foreign Application Priority Data

Feb. 13, 2014   (IL) .......................................... 230969

(51) Int. Cl.
| | | |
|---|---|---|
| *G06F 17/27* | (2006.01) | |
| *G06F 16/951* | (2019.01) | |
| *G06F 16/901* | (2019.01) | |
| *G06Q 30/02* | (2012.01) | |
| *G06F 16/00* | (2019.01) | |
| *G06Q 50/00* | (2012.01) | |

(52) U.S. Cl.
CPC .......... *G06F 17/2785* (2013.01); *G06F 16/00* (2019.01); *G06F 16/9024* (2019.01); *G06F 16/951* (2019.01); *G06Q 30/0244* (2013.01); *G06Q 30/0251* (2013.01); *G06Q 50/01* (2013.01)

(58) Field of Classification Search
CPC .. G06F 17/2785; G06F 16/9024; G06F 16/00; G06F 16/951; G06Q 30/0244; G06Q 30/0251; G06Q 50/01
See application file for complete search history.

(56) References Cited

U.S. PATENT DOCUMENTS

| | | | |
|---|---|---|---|
| 8,386,499 B2 | 2/2013 | Martinez et al. | |
| 8,443,005 B1 | 5/2013 | Goldman et al. | |
| 2008/0104225 A1* | 5/2008 | Zhang | H04L 67/36 709/224 |
| 2013/0018954 A1 | 1/2013 | Cheng | |
| 2013/0054604 A1 | 2/2013 | Boldyrev et al. | |
| 2013/0095864 A1* | 4/2013 | Marovets | H04W 4/14 455/466 |
| 2013/0212479 A1* | 8/2013 | Willis | G06Q 10/10 715/736 |
| 2014/0025660 A1 | 1/2014 | Mohammed et al. | |

* cited by examiner

*Primary Examiner* — Huawen A Peng
(74) *Attorney, Agent, or Firm* — Mark David Torche; Patwrite Law

(57) ABSTRACT

A web-based method and system for influencing entities to change their position using semantic web analysis. The identification of entities that might change their position regarding a certain issue is done through their environment, for example by analyzing semantic text between entities) without making a direct connection with those entities.

19 Claims, 3 Drawing Sheets

WEB-BASED INFLUENCE SYSTEM AND METHOD

CROSS REFERENCE TO RELATED APPLICATIONS

This Application is a continuation of International Patent Application Ser. No. PCT/IL2015/050147, filed Feb. 10, 2015 the entire contents of which is hereby incorporated by reference.

BACKGROUND OF THE INVENTION

Systems and methods for retrieving information stored in a matrix database or structured database for extracting accommodations between entities on the basis of similar properties between the entities is known. The term matrix database in the content here means that each entity has one or more properties that are organized in categories. For example, in the category of "music band" stored the music band that each entity likes and in the category of "books" stored the name of the book, author of the book etc that each entity liked or read. These systems are based on data that will be fed into the system database in a categorical manner such that a user can find entities with a certain property by knowing the properties of each entity in the database.

Predetermined terms used in the following description are provided to help understanding the present invention and the use of the predetermined terms may be modified into different forms without departing from the spirit of the present invention.

The term structured database refers to data that resides in a fixed field within a record or file. This includes data contained in relational databases and spreadsheets. Structured data depends on creating a data model—a model of the types of data that will be recorded and how they will be stored, processed and accessed. This includes defining what fields of data will be stored and how that data will be stored: data type (numeric, currency, alphabetic, name, date, address) and any restrictions on the data input (number of characters; restricted to certain terms such as Mr., Ms. or Dr.; M or F).

The term unstructured data refers to those things that can't be so readily classified and fit into a neat box: photos and graphic images, videos, streaming instrument data, webpages, pdf files, PowerPoint presentations, emails, blog entries, wikis , word processing documents etc.

The term semi-structured data refers to a cross between the two. It is a type of structured data, but lacks the strict data model structure. With semi-structured data, tags or other types of markers are used to identify certain elements within the data, but the data doesn't have a rigid structure. For example, Emails have the sender, recipient, date, time and other fixed fields added to the unstructured data of the email message content and any attachments. Extensible Markup Language (XML) and other markup languages are often used to manage semi-structured data.

The term semantic web refers to web pages contain enough self-describing data that machines will be able to navigate them as easily as humans do. This let computers better assist us in answering questions and managing our ever more complicated world. Some of the semantic web technologies are the resource description network (RDF), web ontology language (OWL), semantic web rule language (SWRL), SPARQL Protocol and RDF query language (SPARQL), Semantic application platforms, and statement-based datastores such as triplestores, tuplestores and associative databases.

The concept of the social semantic web subsumes developments in which social interactions on the Web lead to the creation of explicit and semantically rich knowledge representations. The Social Semantic Web can be seen as a Web of collective knowledge systems, which are able to provide useful information based on human contributions and which get better as more people participate. The Social Semantic Web combines technologies, strategies and methodologies from the Semantic Web, social software , the Web 2.0 and Web 3.0.

The term RDF is a family of World Wide Web Consortium (W3C) specifications originally designed as a metadata data model. It has come to be used as a general method for conceptual description or modeling of information that is implemented in web resources, using a variety of syntax notations and data serialization formats.

The term Web 2.0 in the content of the present application refers to several major themes, including Asynchronous Java script and XML (AJAX), social networking, folksonomies (also known as collaborative tagging, social classification, social indexing and social tagging), lightweight collaboration, social bookmarking, and media sharing.

The term web 3.0 in the content of the present application refers to an Internet-based services that collectively include semantic web, microformats, natural language search, datamining, machine learning, recommendation agents, and artificial intelligence technologies which emphasize machine-facilitated understanding of information in order to provide a more productive and intuitive user experience. Web 3.0 is an environment consisting of intelligent web-based semantic applications, where the web is a database of information published via reusable formats such as XML, RDF and other micro formats. Web 3.0 may bring the realization of the semantic web, where meaning can be extracted from data representations such as hypertext and utility driven by meaning.

U.S. Pat. No. 8,386,499 discloses systems and methods for modeling relationships between entities on a network using data collected from a plurality of communication channels including social data, spatial data, temporal data and logical data within a W4 Network. The W4 Network personalizes and automates sorting, filtering and processing of W4COMN communications delivered or requested to be delivered using personalized value-based ranking and encoding of data, which is modeled from the point-of--view (POV) of any specific user, topic or node in the W4 Distributed graph. The W4COMN is a collection of users, devices and processes that foster both synchronous and asynchronous communications between users and their proxies. POV modeling supplies comparative value services to users which entail individuated data models to be aggregated and used in customization and personalization forecasting for each user and their associated data management needs.

One object of the present invention is to understand the position(s) or opinion(s) of a predetermined public of entities regarding to a specific issue, in particularly understanding who are the influencers entities who are the influenced entities and who are the entities in the public that have the potential to become influenced by others regarding to the specific issue.

Yet another object of the present invention is to reduce the ability of the influencer's entities to influence the influenced and potential influenced entities.

Yet another object of the present invention is to reduce the number of influenced entities regarding to a specific issue and to reduce the spreading of the influence by the influenced entities on the public that is not part in the influenced entities circle.

Yet another object of the present invention is to identify the influencer, the influenced and the potential influence entities and to test and execute actions in the network particularly but not limited to the social network for reducing or increasing the relevant of the particular issue, to reduce or to increase the spreading intensity of the particular issue among the public. In addition another object of the present invention is to measure and estimate the success of the actions taken regarding to the particular issue and the entities.

Yet another object of the present invention is to automatically collect and analyze data of public in a small and large scale for example up to millions of entities.

SUMMARY OF THE INVENTION

The present invention relates to web-based method and system for influencing entities, more specifically the present invention relates to web-based method and system for influencing entities to change their position using semantic web analysis. The identification of entities that might change their position regarding to a certain issue is done through their environment (for example by analyzing semantic text between entities) without making a direct connection with them.

The system and method of the present invention enables to build a cyberspace model for influencers and Influenced in a specific context. The system and method enables to run simulations in order to affect and change the model and monitoring it over time.

In accordance with an embodiment of the present invention there is provided a non-transitory computer-readable storage medium for tangibly storing thereon computer readable instructions for a method for predicting at least one volatility entity in social networks to change his position regarding to a certain subject the method includes, issuing one or more subject need of a requested entity. Based on basic entity attributes and identity, a formal ontology is generated. One or more FOAF graph of entities with links related to the subject need is generated by analyzing text of the entities semantically. Influencer and influenced maps are automatically generated. One or more clusters are generated according to the entities attributes. Afterwards, the clusters are analyzed for generating FOAF graphs for each detected potential influenced entity. Volatility of each of the influenced entity is calculated. Wherein, if the result of the calculation of a certain influenced entity is above a predefined threshold then said influenced entity becomes a target. Thereby, creating and executing strategies to influence said target to change his position.

In this application, the term "Friend" is used in the context of the relation between two entities in any given social network wherein the term "a friend of an entity" means an entity that is connected to another entity in accordance with the relations applied by the network. This relation could be bidirectional (e.g. friend, fan, foe, etc.) or in one direction only (e.g. follower, etc.). The term "Friend of a Friend" or "FOAF" refers to an entity that is connected to a friend of another entity, (e.g. A is connected to B therefore B is a friend of A and C is connected to B, therefore C is a friend of B and a FOAF of A.

BRIEF DESCRIPTION OF THE DRAWINGS

The invention may be understood upon reading of the following detailed description of non-limiting exemplary embodiments thereof, with reference to the following drawings, in which.

Figure 1:
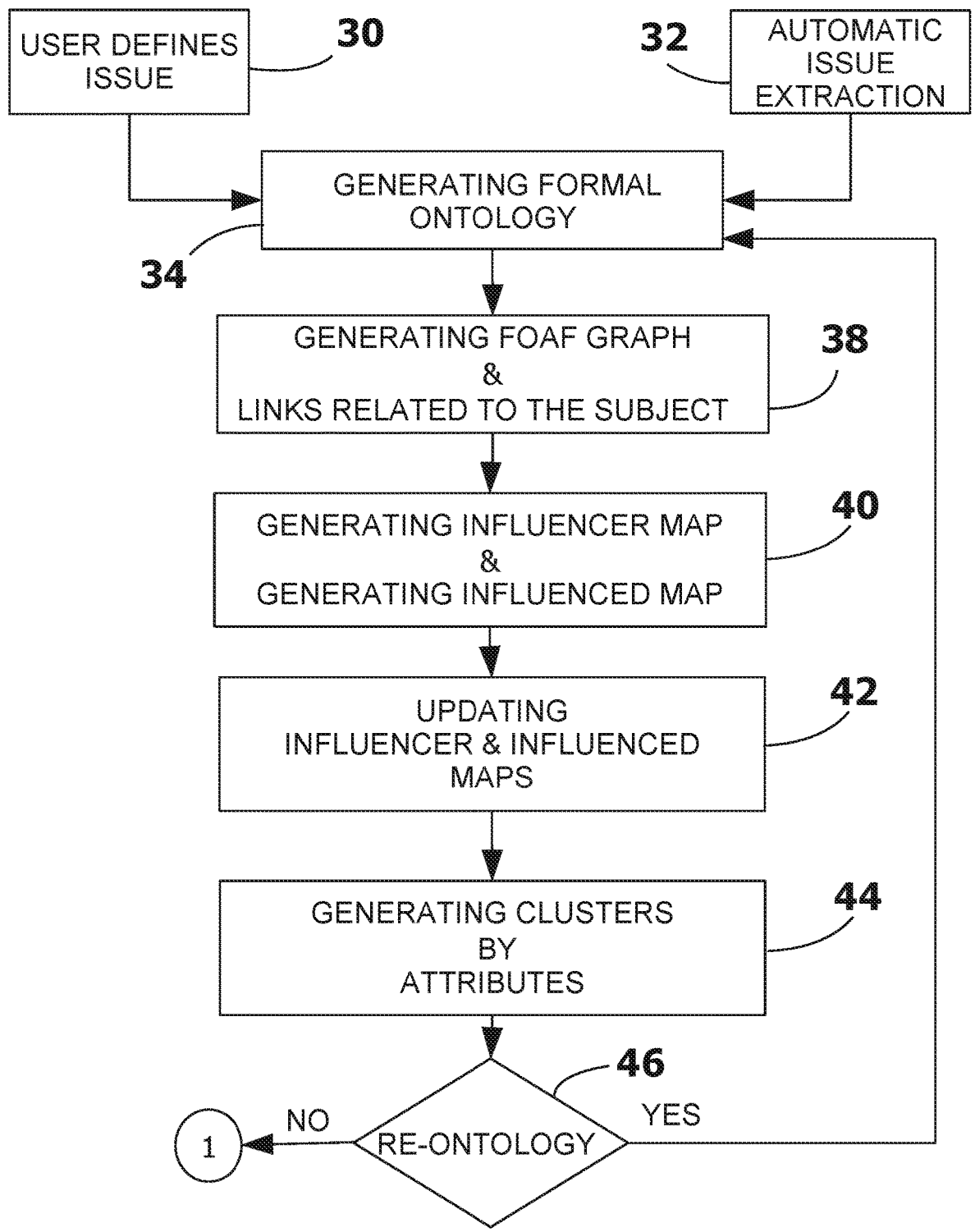
FIG. 1 is a flowchart describing a method for automatically prediction of volatility of persons and influenced them to change their position.

The following detailed description of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

In accordance with the present invention there is provided a method and a system to influence on the position of a defined group(s) of entities regarding to a specific issue. The system in accordance of the present invention automatically finds the position of the entities regarding to the specific issue. In particular the system and method automatically can identify the influencers' entities, influenced entities and the entities to be potentially influenced. The identification of influenced and influencers entities is done without connecting with the entity directly. The system and method of the present invention uses social networks and semantic web analysis of a certain entity to determine the position of the entity regarding to a certain issue and to determine whether the entity is an influencer or influenced entity and also to determine whether the entity is volatility regarding to the issue and his position regarding to the issue could be changed.

The term influence is defined as the act, power, or capacity of causing an effect in indirect or intangible ways. The term influence in accordance of the present invention will be used the following as the definition for digital Influence: The ability to cause effect, change behavior, and drive measurable outcomes online. Influencers, as they're often labeled, form strong unions with like-minded individuals within social networks and fortify those connections with value and meaningful interaction. These influencers are individuals who may possess the capacity to influence based on a variety of factors, such as but not limited to a substantial or concentrated following in social networks, notable stature, or authority within a community, and the size or loyalty of an audience.

In accordance with the present invention the system and method may reduce the influence effect of the influencers on the influenced entities regarding to the specific issue. The system and method of the present invention also may reduce the number of entities that are influenced regarding to a specific issue. The system further may reduce the spreading influence on the entities in the group that is not in the influenced entities.

The system and method of the present invention may identify the influenced entities, the influencers' entities and the potential entities that could become influenced regarding to the specific issue. The system and method of the present invention may produce and execute action in the WEB for reducing the volume of the specific issue, reducing the spreading impact of the issued in the group of entities. In the addition the system and method of the present invention may collect and analyze information automatically to determine if the executed actions were succeeded to reduce the volume of the specific issue, reducing the spreading impact of the issued in the group of entities and reducing the number of influenced entities.

In accordance with some embodiments of the present invention there is provided a method and a system for finding people, organizations or any other entity that can help the need of a certain individual. Such individual could be an individual that the system chooses automatically or an individual that requested to find people, organizations or any other entity that help his need. The term "need of the individual" could be a product, action, information, attitude towards an issue, service and the like. The need can be requested in real time or for a certain purpose in a certain time (Ad-Hoc). The answers for the individual would be also relevant in a certain time (for example today, this week etc.) and Ad-hoc. The entities that will be found by the system will be similar to the profile of the individual by one or more defined attributes such as but not limited to language, professional, age and more. The system generates a graph based on friends in the social network and links between them upon communication between them and also by analyzing semantically texts which will help define their profiles for example identifying their needs and interests Ad-Hoc for example their needs and interests for the current week in opposed to general hobby or general interest.

In accordance with the present invention there is provided an automatic re-ontology, meaning finding new ontology or updating previous formal ontology. The re-ontology is produced automatically by re-browsing and/or re-analyzing of structured, sub-structured and/or unstructured content in the social networks or other types of web networks or repositories. . More specifically the automated re ontology could be performed by detecting interest, issue, event, expression, place or any other data object which occurs in the clustered entities differently than in general population and combine this newly discovered object in the reclustering parameters in a manner that optimizes the output social graph.

In accordance with the present invention a certain need of an entity in a certain time which could be for example today or this week, will be recognized by the system and the system will update automatically the formal ontology of the entity. The automatic ontology updating includes adding new entities adding or replacing old need or issue with a new need or issue etc. The automatic updating of the formal ontology of the entity is referred hereinafter as re-ontology. After the updating of the formal ontology, a private cloud or friend of a friend (FOAF) graph for each entity can be generated. The graph will include all the entities that have a link, predicate or a tie with the entity or issue that initiated the certain need. Each entity in the FOAF graph may also have one or more private clouds or FOAF graph which may updated in a certain time for example today, in every week etc. Each private cloud may also include entities that have the same need or issue of the original initiated entity or issue. The entities that have the same need or issue of the original requested entity or issue have also private clouds, some of the entities in the original cloud may be linked also with one or more of the entities that have the same need of the original requested entity and may also include new entities because of slightly different profile attributes of the entities that have the same need or attitude towards an issue of the original requested entity or issue. The process of generating private clouds will be stopped when the entities that have the same need or issue of the original entity is not generating new entities for the graph or cloud of the original entity or issue. In the end of the process there will be a list of entities that have similar need or issue and each entity have private clouds because of one or more different attribute or profile of the entity.

In accordance with the present invention there is also provided a prediction of volatility potential of entities per pre-determined issue in the semantic web, using multi-private clouds. Every cloud is a set of entities that includes a volatility potential of entities that may have a high probability to change their position regarding to a certain issue determined automatically by the system or by the requested entity. The cloud also includes entities that have similarity to the volatility potential of entities for example similar properties such as profession family status etc.

Figure 2:
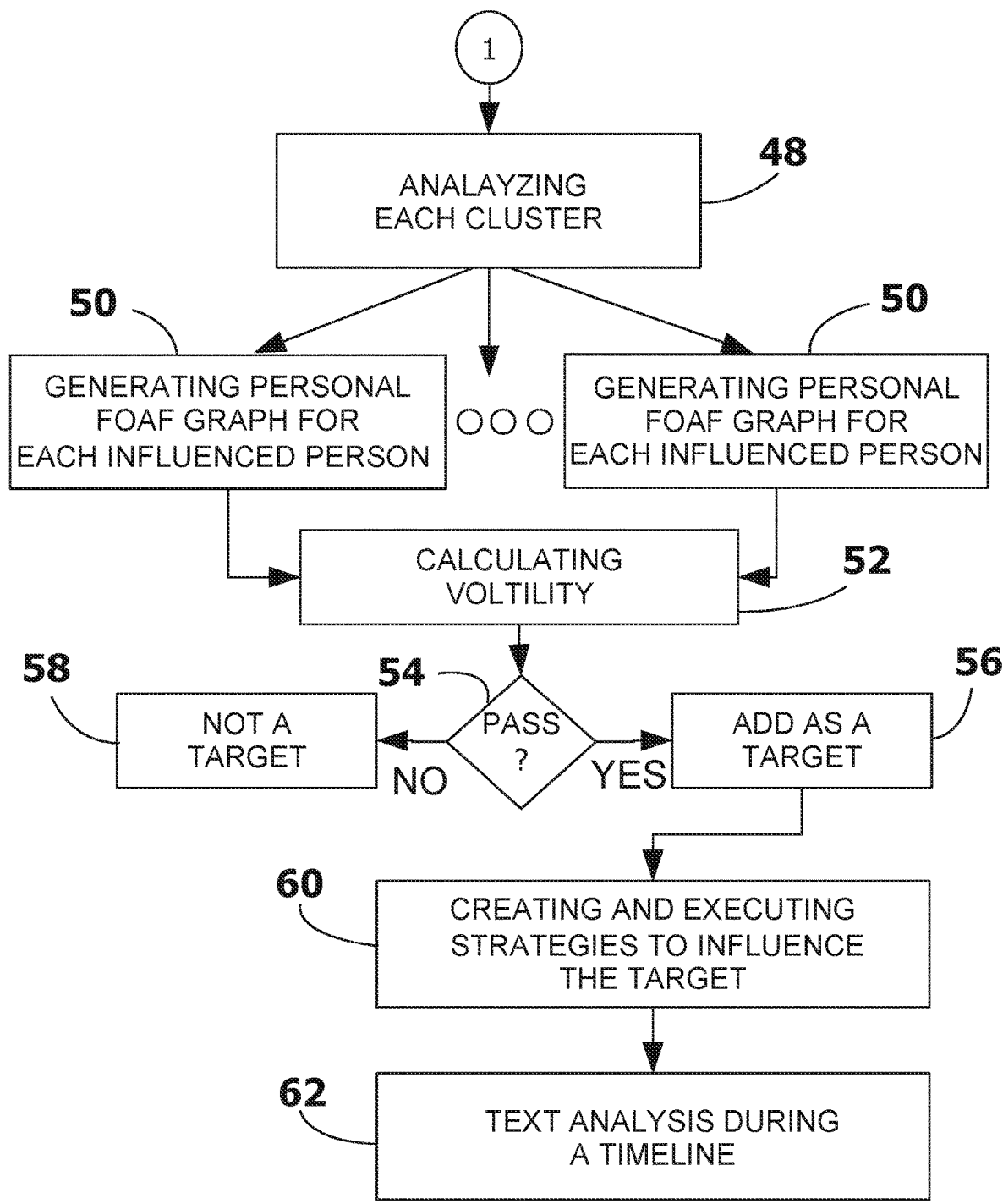
FIG. 2 is a continuation of the flowchart shown in FIG. 1.

Referring now to FIGS. 1 and 2 there is provided a method for identifying potential volatility of entities regarding to a certain issue of a specific subject. The method further includes identifying one or more entities that have a high potential to influence the volatility of entities to change their position regarding to the certain issue of a specific subject requested by the user or automatically generated by the system.

Once identifying the entities that can be influenced on these potential influenced entities and identifying the activity to be used by the influential to change their position regarding to the certain issue, the influence activity can be executed on the influenced entities depending on the profile of the entity that can be influenced and/or the profile of the influencer.

In accordance with the present invention there is provided two modes of operation, a supervised mode 30 and an unsupervised mode 32. In supervised mode 30 a user defines an issue for example a user wants preferences about bicycles in Amsterdam. The preferences are bicycles in general and in particular BMX bicycles in Amsterdam. In an unsupervised mode 32 the system automatically defines a target issue. In step 34 the system generates a formal ontology regarding the defined issue, for example, formal ontology of "bicycles in Amsterdam", a formal ontology generated of all entities such as but not limited to people, stores, clubs, rental of bicycles, bicycles parking lot that relates to the defined issue which can be defined as described above in the supervised mode 32, or defined in the unsupervised mode 30. The formal ontology of the defined issue can be accomplished by using technologies such as but not limited to TopBraid tool which is a collection of integrated semantic solution, a product of the company TopQuadrant, Inc. Another example of technology that can be used for generating the formal ontology is Protégé which is an open source platform that can generates a formal ontology.

In step 38 the system generates a link based graph that can be extracted from the formal ontology. The link based graph can be generated by using semantic web technologies such as but not limited to AllegroGraph, a product of the company Franz, Inc.

An example of the link based graph can be but not limited to generating FOAF ontology link based graph regarding the subject of the defined issue. FOAF ontology is a machine-readable ontology describing entities, their activities and their relations to other entities. FOAF is a descriptive vocabulary expressed using the Resource Description Framework (RDF) and the Web Ontology Language (OWL). The FOAF ontology is accomplished for example by defining relationships between the entities. Each entity has a unique identifier (such as the person's e-mail addresses, a jabber ID, or a URI of the homepage or weblog of the person), which is used when defining these relationships.

In step 40 generating influencer and influenced map regarding to the target issue. According to the relations in the linked based graph that was generated in step 38. Maps of influencer entities and influenced entities are generated by applying Social Network Analysis (SNA) such as but not limited to AllegroGraph, product of the company Franz, Inc. Social network analysis (SNA) in the content of the present invention relates to the analysis of social networks such as but not limited to Twitter, Facebook, and Blogs. Social network analysis views social relationships in terms of network theory, consisting of nodes (representing individual entities within the network) and ties or links (which represent relationships between the entities, such as friendship, kinship, organizations, sexual relationships, etc.) These networks are often depicted in a social network graph, where nodes are represented as points and ties or links are represented as lines.

In the example of the FOAF ontology of "bicycles in Amsterdam" a relation map of influencers and influenced entities to choose BMX bicycles in Amsterdam is generated.

In step 42 the influenced and influencer maps are updated by using semantic web technologies such as but not limited to automatic text analysis. An example of such text analysis technology is the product COGITO of the company Expert System. In this step SNA technologies and semantic web analysis such as text analysis are being integrated for updating the influenced and influencer map. In this step the map is being more accurate meaning that the map of relations between entities are being updated by analyzing semantically the text content between the entities.

In the example of the FOAF ontology of "bicycles in Amsterdam" a relation map of entities that can influence influenced entities regarding sub-issues such as sports and/or sport cycling, the type of bicycles, manufactures of bicycles, bicycles that relatives of entities have, etc. These influenced and influencer maps are updated more accurately by semantically analyzing text between the entities in regards to the defined issues and sub-issues.

In step 44 generating clusters by attributes. In this step the system divides the entities in the graph to clusters in which around every entity (influenced or influencer entity) a private cloud of entities is automatically generated according to defined attributes such as but not limited to age, profession, address, etc. In this step the system by using text analysis can automatically generates a new attribute by using a defined statistic criteria or delete old attribute. Similar entities will be in the same cluster by using text analysis.

Clustering is the task of grouping a set of entities according to a certain attributes such that the set of entities in the same group are called a cluster. Such set of entities are more similar (in some sense or another) to each other than to those in other groups (clusters). It is a main task of exploratory data mining, and a common technique for statistical data analysis.

After step 44 the system based on text analysis may automatically repeat steps 34, 38, 40, 42 and 44. In order to stop the repetition, in step 46 a convergence ending rule of repetition is predefined by the user or automatically defined by the system.

In step 48 the system analyzes each cluster targeting influencer and influenced and main similarity attributes for enabling deduction of influencing strategies.

In step 50 the system generates personal FOAF graph for each influenced person/entity and automatic production of chain of semantic graphs is created. Each graph contains a person/entity with all its relations (relations based on the issue or other unknown relation) that shares common properties. For example three teachers that are in favor of BMX bicycle, four teachers that are not in favor of BMX bicycle and two teachers that are not related to the issue.

In this step a statistic analysis of the influenced person will be used as a basis for determine whether the person can be influenced and change his position regarding to the requested issue. For example what is the probability that the person/entity that rides on road bicycle will change his position regarding BMX and starts to ride on a BMX, or what is the probability that a person will want to upgrade his BMX bicycle.

In step 52 calculating volatility, in each cloud for every influenced person the system calculates and predicts whether the person will change his position, preference and/or interest. The volatility calculation can be based for example on one or more measures: by calculating the number of entities in the cloud in favors the issue in respect to entities in the cloud that are not in favor of the requested issue. Another measure is the strength of the bond between entities that have a similar position relative to the strength of the relationship between the entities in the cloud that don't have similar position. For example if all entities are in the same position then the power is 1. If only 30% are in the same position, the intensity is 0.3 (after normalization of the number of entities in the cloud) and so on. Ratio of the intensities of the two groups is the magnitude of the effect. In the end of this step a volatility prediction score is calculated for each private cloud.

In step 54 if the volatility prediction score is above a determine threshold then the entity becomes a target in step 56 of the influencer(s) to influence him to change his position regarding to the requested issue. If the volatility prediction score is below the determine threshold then in step 58 the entity is not being a target.

In step 60 one or more strategies to influence the entity are being created and executed in the social network. For example, Online forum manipulation strategies, the system in accordance with some embodiments of the present invention will be able recognizing the most important and influential discussion groups (in any specific topic)—as well as the leading (most influential) members in these groups—and post either supporting or provocative messages that will shift the discussion to a different direction. Using the system can create a false consensus in online conversations, crowd out unwelcome opinions and smother commentaries or reports that do not correspond with its own objectives.

Another example strategy to manipulate entities, when recognizing trends even in small groups which are not Googling and use automated retweeting (in a specific Twitter discussion) spreading the discussion to a larger number of people in order to catch the attention of the media for changing position regarding to a specific issue or changing topic.

In step 62 how the execution of the strategies helped to influence the target entity to change his position is examined during time line by using text analysis. If there is a lack of data for determining whether the strategies work the examination is left open during timeline for further examination.

Figure 3:
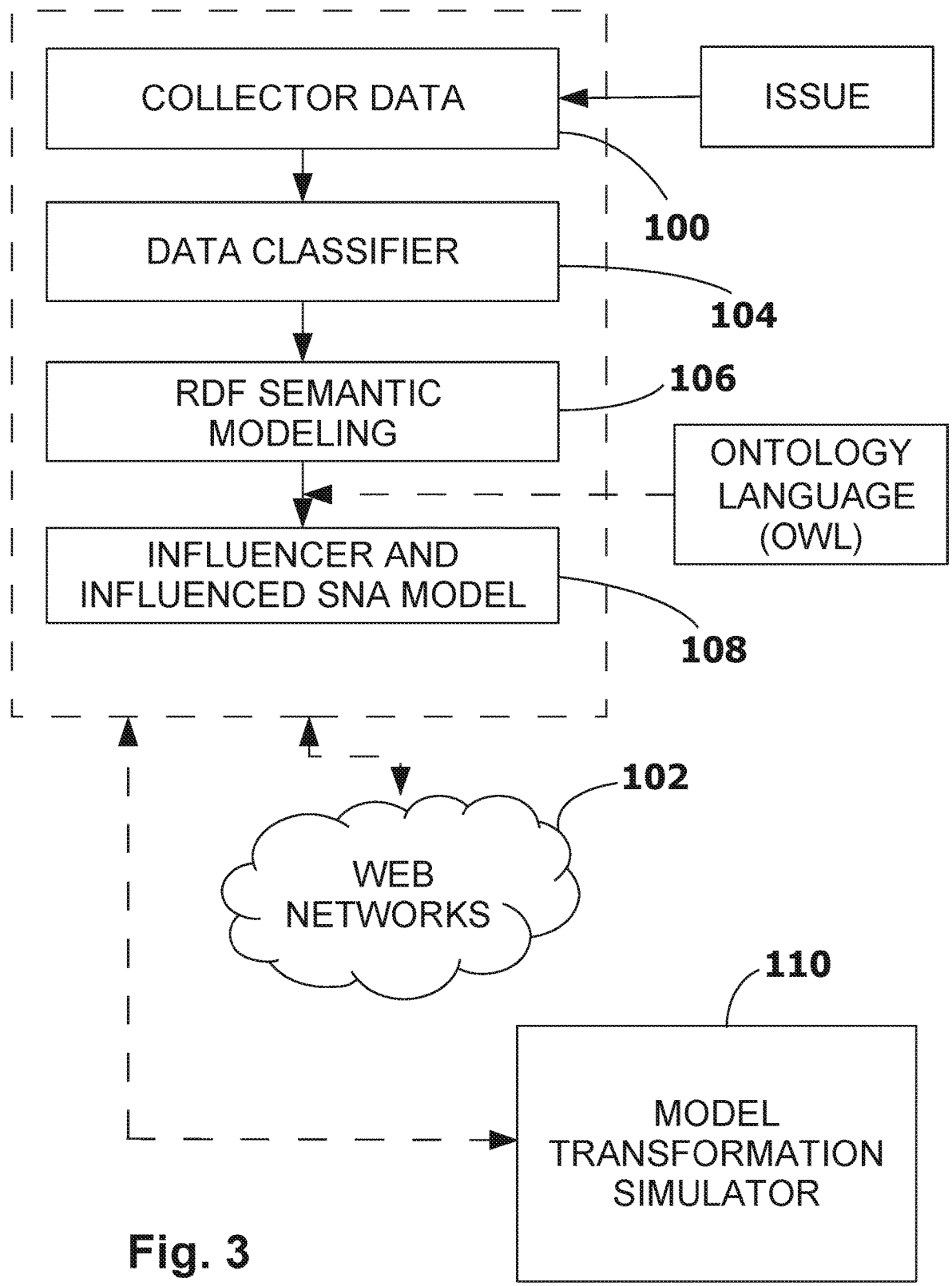
FIG. 3 is the system layers schematic block diagram in accordance with some embodiments of the present invention.

Referring to FIG. 3, the data collector layer 100 collects data from variety web arenas 102, e.g. web sites, social networks, blogs, newspapers leading web tribes and more. Parallel crawlers are used for example in order to meet the need of downloading and storing the massive amount of collected data. Data classifier 104 classifies and filters the textual information collected by the data Collector layer 100. The Resource Description Framework (RDF) builder layer 106 edits the textual data and transforms them into graph model based on Entities and Predicates:

Entities—represent people, places, organization, events etc.

Predicate—represents the relationship type between entities, activities between entities, organization reference, task reference, events reference etc.

RDF is a standard model for data interchange on the Web. RDF has features that facilitate data merging even if the underlying schemas differ, and it specifically supports the evolution of schemas over time without requiring all the data consumers to be changed. RDF extends the linking structure of the Web to use URIs to name the relationship between things as well as the two ends of the link (this is usually referred to as a "triple"). Using this model, it allows structured and semi-structured data to be mixed, exposed, and shared across different applications. This linking structure forms a directed, labeled graph, where the edges represent the named link between two resources, represented by the graph nodes. This graph view is the easiest possible mental model for RDF and is often used in easy-to-understand visual explanations.

Influencers and Influenced Social Network Analysis (SNA) Model Builder 108 gets the RDF model as an input and with predefine OWL (Ontology Web Language) structure convert the RDF model to influencers and influenced SNA model. With OWL "Quantitative measurements" can be predefined which enables categorizing influencers and influenced respectively to the topologic relationship between the entities and the "content" (semantic web) between the entities.

The following are some options or examples to define the quantitative measurements with OWL: Metrics and KPI (Key Performance Indicators), Rules, Facts and relationships between entities, complex rules and queries.

By collecting and analyzing this data between entities the system and method of the present invention can find out "WHO says WHAT to WHOM and through which channel (channels such as but not limited to web pages, social networks, forums, Facebook, Twitter)". Given this information it is possible to; identify active networks for specified topics. Locate key individuals who are active on these networks. Create a socio-demographic profile of key entities. Determine key entities status (location) within the topical network. Focus on high-resonance individuals.

Below some examples of factors affecting communicators' effectiveness (resonance): Location on the net—Greater number of connections and higher frequency of activity are associated with greater resonance. Similarity—In general communicators are more effective when addressing an audience that is similar to themselves on a wide variety of geographic and socio-demographic features. Based on actor's profiles a similarity matrix for each communicator is created. Communicator expertise—Communicators who are perceived as experts on a given topic are likely to be more influential. Network type—"tight" networks afford greater resonance than "loose" networks.

Model Transformation Simulator (MTS) 110 gets the SNA influencers and influenced model 108 as an input, and enables the users to run several simulations with actions bank. The simulation result includes the following:

The mean of a probability

The time needed to effect

In addition, the MTS will provide the user the evaluation impact and the impact direction—analyzes "chances" between entities—not only on the user's activities on the web but also correspondence from affinity/ proximity between features/characteristics of entities.

Simulation cycles are composed by three functions: "Action", "Choose" and "Spread". The routine "Action" scans all agents. Those marked as "considering joining an unwelcome activity" are evaluated by the routine "Choose". If this routine returns a positive value (i.e. they actually joined the activity), then the same agents are evaluated by the routine "Spread". For agents marked as "unaware", the routine "Action" draws a random variable, which, with a small probability, switches their state as "considering".

Embodiments of the invention are not limited to any particularly environment, application or specific implementation. For example the embodiments described are in reference to uniquely identified web items (e.g. activity feed entries in online social networks, site links, blog posts, web videos, etc) but the invention can be advantageously applied to provide suggestions for any type of information item acted upon by the users profiled within a social graph (e.g. email messages, applications for mobile phones, reference to a physical place, etc). Therefore, the description of the embodiments that follows is for purposes of illustration and not limitation.

In the case of implementation by hardware, a method according to the exemplary embodiment of the present invention may be implemented by application specific integrated circuit (ASICs), digital signal processors (DSPs), digital signal processing devices (DSPDs), programmable logic devices (PLDs), field programmable gate arrays (FPGAs), a processor, a controller, a microcontroller, a microprocessor, and the like.

In the case of implementation by firmware or software, the method according to the exemplary embodiments of the present invention may be implemented in the form of a module, a process, or a function of performing the functions or operations described above. Software codes may be stored in a memory unit and driven by a processor. The memory unit is positioned inside or outside of the processor to transmit and receive data to and from the processor by various known means.

Further, term "module" described in the specification imply a unit of processing a predetermined function or operation and can be implemented by hardware or software or a combination of hardware and software.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A WEB-based method for automatically identifying semantically a specific issue, by collecting public available information from the WEB regarding said specific issue, clustering at least one entity with an interest in said specific issue into an ontology and automatically clustering into a re-ontology of said at least one entity with an interest in said specific issue, said method comprising:

issuing, using a computing device, at least one parameter to indicate an interest in said specific issue of a requested entity;

automatically generating, using the computing device, a formal ontology based on a basic entity attributes and identity;

automatically generating, using the computing device, at least one friend of a friend graph of entities with links, and having text related to the specific issues, by semantically analyzing the text of said entities;

generating, using the computing device, automatic production of a chain of semantic graphs;

automatically generating, using the computing device, influencer and influenced maps of entities;

automatically generating, using the computing device, at least one cluster by attributes of the at least one entity;

automatically analyzing, using the computing device, said clusters;

automatically generating, using the computing device, personal friend of a friend graphs for each detected influenced entity and automatically producing said chain of semantic graphs;

generating automatically re-ontology regarding said specific issue, by way of optimizing the clustering process in accordance with:
    said automated friend of a friend graphs linked to said entities texts,
    said automatically generated chain of graphs,
    said influencer and influenced maps,
    said analyzed clusters, and
    said chain of semantic graphs,
and reclustering all optimized graphs into a new set of said graphs and chains;

automatically calculating, using the computing device, volatility of each influenced entity; if the result of the calculation of a specific influenced entity is above a predefined threshold then said influenced entity becomes a targeted individual; and creating and executing, using the computing device, strategies to influence said targeted individual to change his opinion on the specific issue, wherein the volatility calculation is based on one or more of the following criteria: the number of entities in the personal friend of a friend graphs in favor of the specific issue with respect to entities in the personal friend of a friend graphs that are not in favor of the specific issue; the strength of the bond between entities that have a similar opinion relative to the strength of the relationship between the entities that do not have a similar opinion.

2. The method according to claim 1 further using the computing device for reducing the influence effect of the influencers entities on the influenced and potential influenced entities regarding the specific issue.

3. The method according to claim 1 further using the computing device for changing the number of influenced entities regarding to a specific issue and to change spreading of the influence by the influenced entities on the public that is not part in the influenced entities.

4. The method according to claim 1 further using the computing device for automatically testing and executing actions in the WEB particularly but not limited to a social network for reducing or increasing the relevance of the specific issue, to reduce or to increase the spreading intensity of the specific issue among the public; and, measuring and estimating the success of actions taken regarding to the specific issue and the entities.

5. The method according to claim 1 wherein, said optimizing of the clustering process is modified during a timeline.

6. The method according to claim 1 wherein said method is based on WEB 2.0 and WEB 3.0 technologies.

7. The method according to claim 1 wherein said issuing at least one parameter to indicate an interest in said specific issue is issued automatically by analyzing text of said requested entity.

8. The method according to claim 1 wherein said friend of a friend graph is stored temporary.

9. The method according to claim 1 wherein, a specific need of an entity at a particular time will be automatically identified; and the formal ontology of the entity will be updated automatically.

10. The method according to claim 1 wherein said friend of a friend graph is updated in any time based on said updated formal ontology.

11. The method according to claim 1 wherein, said influenced and influencer maps are updated based on text analysis.

12. The method according to claim 1 wherein, said clusters are updated based on said updated influenced and influencer maps.

13. The method according to claim 1 wherein the optimized data is detected by using statistical criteria and wherein, said optimized data is added as a new attribute.

14. The method according to claim 1, wherein said strategies regarding said targeted individual are examined whether said targeted individual has changed his opinion by using text analysis during a predetermined timeline.

15. The method according to claim 14, wherein if during said predetermine timeline of text analysis there is insufficient information to determine whether said targeted individual has changed his opinion then said text analysis continues to be activated to determine if said targeted individual changes his opinion.

16. A web-based system for influencing entities to change their opinion using semantic web analysis for performing an automatic re-ontology as described in claim 1, said system comprising:
    a data collector layer for collecting data from a variety of web arenas;
    a data classifier for classifying and filtering the textual information collected by said data collector;
    a Resource Description Framework (RDF) builder layer for editing said textual information and transforming the textual information into a graph model based on entities and predicates; and
    an influencers and influenced Social Network Analysis (SNA) Model Builder configured to receive said graph model as an input and with predefined OWL (Ontology Web Language) structure, and configured to convert said graph model to an influencers and influenced SNA model.

17. The web-based system according to claim 16, further comprising a Model Transformation Simulator (MTS) that receives said SNA influencers and influenced model as an input, and enables the users to run several simulations with an actions bank for changing the opinion of entities regarding to a specific issue.

18. A computing device for predicting at least one volatility entity in a social network to change the opinion of a targeted individual regarding a specific issue, said computing device comprising:
    a processor;
    a storage medium for tangibly storing thereon program logic for execution by the processor, the program logic comprising:

logic executed by the processor for issuing at least one parameter to indicate an interest in said specific issue of a requested entity;

logic executed by the processor for generating a formal ontology, based on basic entity attributes and identity;

logic executed by the processor for generating at least one friend of a friend graph of entities with links related to the at least one parameter to indicate an interest in said specific issue by analyzing text of said entities semantically;

logic executed by the processor for generating influencer and influenced maps;

logic executed by the processor for generating at least one cluster by entity attributes;

logic executed by the processor for analyzing said clusters;

logic executed by the processor for generating personal friend of a friend graphs for each detected influenced entity;

logic executed by the processor for calculating volatility of each influenced entity;

logic executed by the processor for generating automatically re-ontology regarding said specific issue, by way of optimizing the clustering process with accordance with:

said automated friend of a friend graphs links to said entities semantics, said automatic generated graph of graphs, said influencer and influenced maps, said analyzed clusters, and a chain of semantic graphs, and reclustering all the optimized data into a new set of said graphs and chains;

automatically calculating, using the computing device, volatility of each influenced entity;

wherein if the result of the calculation of a particular influenced entity is above a predefined threshold then said influenced entity becomes a targeted individual;

thereby, creating and executing, using the computing device, strategies to influence said targeted individual to change his opinion; and wherein the processor is configured to perform the method of claim 1.

19. A non-transitory computer-readable storage medium for tangibly storing thereon computer readable instructions for a method for predicting at least one volatility entity in a social network to change his opinion regarding a specific issue, in accordance with the method of claim 1.

* * * * *